US007230395B2

(12) United States Patent
Horii (10) Patent No.: US 7,230,395 B2
(45) Date of Patent: Jun. 12, 2007

(54) VOLTAGE CONVERTING CIRCUIT FOR ELECTRIC VEHICLES

(75) Inventor: Yusuke Horii, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 11/391,482

(22) Filed: Mar. 29, 2006

(65) Prior Publication Data
US 2006/0220601 A1    Oct. 5, 2006

(30) Foreign Application Priority Data
Mar. 29, 2005    (JP)    ............................... 2005-96130

(51) Int. Cl.
*B60L 11/00*    (2006.01)
(52) U.S. Cl. ...................... 318/139; 318/442; 180/65.2
(58) Field of Classification Search ........ 318/139–140, 318/441–442; 180/65.1–65.4; 320/15, 30, 320/43, 48; 701/21–22
See application file for complete search history.

(56) References Cited

U.S. PATENT DOCUMENTS

| | | | | |
|---|---|---|---|---|
| 5,717,310 A | * | 2/1998 | Sakai et al. | ................. 307/10.1 |
| 6,828,742 B2 | * | 12/2004 | Suzuki et al. | ................ 318/139 |
| 6,923,279 B2 | * | 8/2005 | Shimane et al. | ........... 180/65.1 |
| 6,930,460 B2 | * | 8/2005 | Ishikawa et al. | ............ 318/442 |
| 6,966,803 B2 | * | 11/2005 | Hara et al. | ...................... 440/6 |

FOREIGN PATENT DOCUMENTS

JP    2004 120866    4/2004

\* cited by examiner

*Primary Examiner*—Bentsu Ro
(74) *Attorney, Agent, or Firm*—Jacobson Holman PLLC (57) ABSTRACT

A voltage converting circuit for electric vehicles that is capable of stably performing precharge control from a high voltage battery to an inverter. The voltage converting circuit includes a high voltage battery for supplying electric power to a vehicle drive motor; and an inverter, which is interposed between the high voltage battery and the vehicle drive motor and has a capacitor, for converting a direct current, supplied from the high voltage battery, to an alternating current and supplying to the vehicle drive motor. The voltage converting circuit further includes a voltage converter, connected to the high voltage battery in parallel with the inverter, for converting a voltage of the high voltage battery to a low voltage and outputting the low voltage; a contactor circuit, interposed between the high voltage battery and the inverter, for performing a process of suppressing rush current relative to the inverter when supplying electric power of the high voltage battery to the vehicle drive motor; and voltage a converter start-up enabling units and for enabling start-up of the voltage converter when a conclusion of the suppression process performed by the contactor circuit is sensed.

3 Claims, 6 Drawing Sheets

VOLTAGE CONVERTING CIRCUIT FOR ELECTRIC VEHICLES

BACKGROUND OF THE INVENTION (1) Field of the Invention

The present invention relates to a voltage converter for converting the electric power of a high voltage battery, equipped in an electric vehicle, to a low voltage and charging a low voltage battery.

(2) Description of the Related Art

Electric vehicles including a hybrid electric vehicle are typically equipped with a vehicle drive battery (high voltage battery) for storing a DC power of relatively high voltage (e.g. about 500 V), an inverter for converting the DC power of the vehicle drive battery to AC power, and a vehicle drive motor that is driven by the AC power converted by the inverter. By rotating driving wheels connected to the output shaft of the vehicle drive motor so that power can be transferred, the vehicle is caused to travel.

In addition to the vehicle drive battery, electric vehicles are further equipped with an electric equipment battery (low voltage battery) for storing a DC power that has a relatively low voltage (e.g. 24 V or 12 V). The electric equipment battery is used to operate vehicle-mounted electric equipment, which includes lamp equipment (such as head lamps, stop lamps, etc.), air-conditioning equipment (such as an air-conditioning compressor, capacitors, etc.), audio equipment (such as a car stereo set, etc.), steering and brake equipment (such as an electric power assisted steering wheel, brake vacuum pumps, etc.), control equipment (such as various electronic control units, etc.), and so forth.

The electric equipment battery is connected with the vehicle drive battery via a voltage converter (DC/DC converter), so that the electric power of high voltage from the vehicle drive battery is converted to a low voltage by the voltage converter and stored in the electric equipment battery.

To prevent excessive rush current from entering an electric system, such electric vehicles or hybrid electric vehicles perform a rush current suppression process, called precharge control, at the time of starting up the high voltage equipment (i.e., the vehicle drive motor).

This precharge control will hereinafter be described in detail. A switch (main contactor) is interposed between the vehicle drive battery and the inverter to break an electrical connection with the vehicle drive battery. To suppress a variation in the voltage supplied from the vehicle drive battery, a capacitor is provided at the input terminal of the inverter and smoothes an input voltage and then converts DC power to AC power.

However, if a direct current from the vehicle drive battery is input to the inverter via the main contactor, an extremely high current (rush current) will flow into the aforementioned capacitor in a short time and therefore damage, such as the contact of the main contactor being melted, will be caused.

To avoid such damage, a switch (precharge contactor) and a resistor are arranged in parallel with the main contactor so that, before the main contactor is made on, the precharge contactor is made on. In this arrangement, the capacitor at the input terminal is gradually charged and the voltage of the capacitor rises, so that a voltage difference between the vehicle drive battery and the capacitor (inverter) becomes small. Thereafter, the main contactor is made on. This control (precharge control) can prevent excessive rush current from being generated when the main contactor is made on, thereby avoiding the occurrence of damage to the main contactor.

Figure 4:
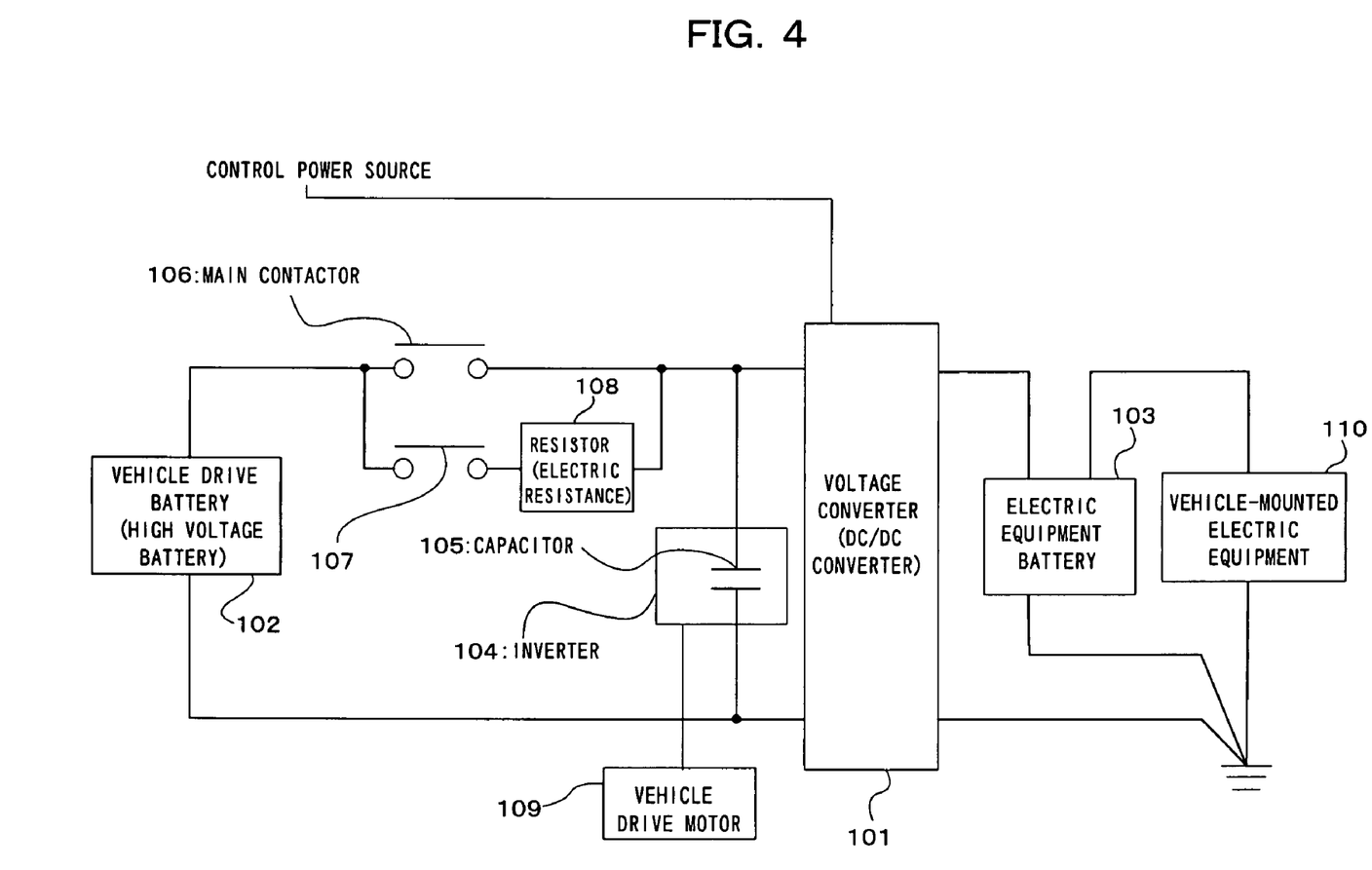
FIG. 4 is an electric circuit diagram showing a voltage converting circuit in a conventional electric vehicle.

FIG. 4 shows the electric circuit of the power source unit of a conventional electric vehicle. As shown in the figure, a vehicle drive motor 109 is connected with a vehicle drive battery 102 through an inverter 104. An electric equipment battery 103 is connected to the vehicle drive battery 102 through a DC/DC converter 101 in parallel with the inverter 104. The electric equipment battery 103 is further connected to vehicle-mounted electric equipment 110.

Between (1) the vehicle drive battery 102 and (2) the inverter 104 and DC/DC converter 101, a main contactor 106 and a precharge contactor 107 are interposed in parallel in order to break an electrical connection between them. A resistor 108 is arranged in series with the precharge contactor 107. Also, a capacitor 105 is arranged at the input terminal of the inverter 104.

Therefore, in the case where the vehicle drive motor 109 is actuated in starting the vehicle, the precharge contactor 107 is first made on so that the capacitor 105 is gradually charged. If the capacitor 105 is sufficiently charged, and a voltage difference between the vehicle drive battery 102 and the capacitor 105 becomes small enough, the main contactor 106 is made on.

If the main contactor 106 is made on, the electric power of the vehicle drive battery 102 is supplied to the vehicle drive motor 109 through the inverter 104, and driving wheels connected to the vehicle drive motor 109 are rotated. On the other hand, the electric power of the vehicle drive battery 102 is converted to a low voltage through the DC/DC converter 101 and stored in the electric equipment battery 103. The supply of electric power from the electric equipment battery 103 causes the vehicle-mounted electric equipment 110 to operate.

Note that the DC/DC converter 101 is further connected with a control power source. If a voltage is input from the control power source to the DC/DC converter 101 and also a voltage (operating voltage) in a normal range is input from the vehicle drive battery 102 (which is a charging power source) to the DC/DC converter 101, it begins to operate.

Figure 5A:
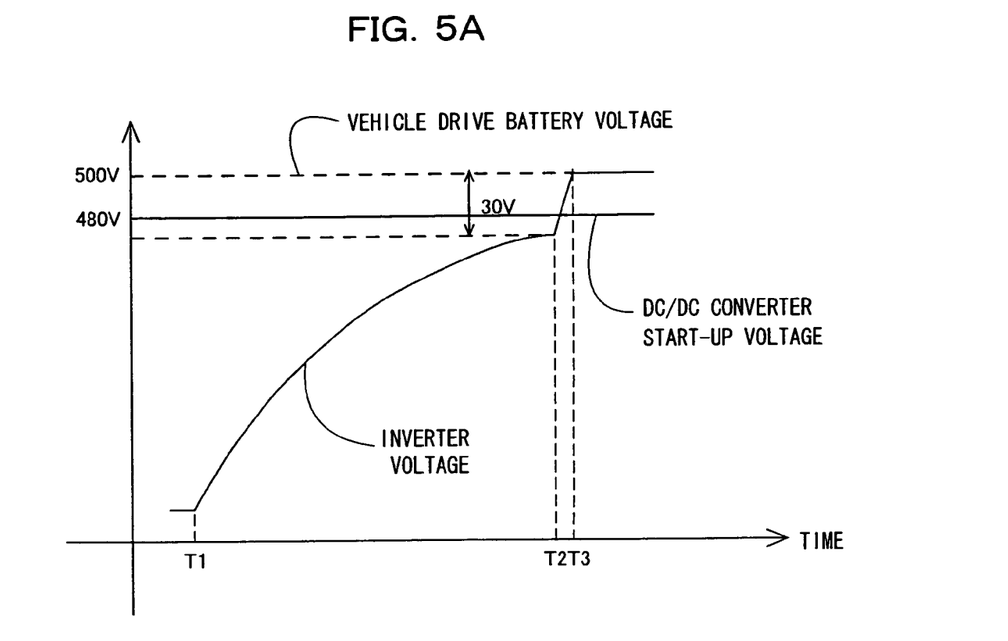
FIGS. 5A and 5B are graphs showing the relationship between (1) a rise in voltage of the inverter and (2) the voltage of vehicle drive battery and operating voltage of the DC/DC converter when precharge control is performed by the conventional voltage converting circuit of FIG. 4, FIG. 5A showing the case where there is no fault, FIG. 5B showing the case where the output voltage of the vehicle drive battery is higher than a normal voltage.

FIG. 5A shows a rise in voltage of the capacitor 105 at the time of precharge control. As shown in the figure, in the case where the vehicle drive motor 109 is actuated in starting the electric vehicle, the precharge contactor 107 is first made on at time T1, so that precharge control is started. The capacitor 105 is gradually charged and rises in voltage. Thereafter, if the voltage difference between the vehicle drive battery 102 and the capacitor 105 becomes sufficiently small (e.g. about 30 V) at time T2, the precharge control is concluded and the main contactor 106 is made on. If the main contactor 106 is made on, the voltage of the capacitor 105 rises steeply and becomes equal to the voltage of the vehicle drive battery 102 at time T3. If the voltage of the capacitor 105 reaches the operating voltage (e.g. 480 V) of the DC/DC converter 101 during the time interval of T2 to T3, the DC/DC converter 101 is operated and converts the high voltage power of the vehicle drive motor 102 to a low voltage and supplies electric power to the electric equipment battery 103.

The conclusion of the precharge control can be judged by whether the voltage difference between the vehicle drive battery 102 and the capacitor 105 is a predetermined value or less, as described above. The conclusion can also be judged by whether the lapse of time from the start of the precharge control reaches a predetermined period of time, or whether the voltage rise rate of the inverter 104 (capacitor 105) is a predetermined rate or less.

Figure 6:
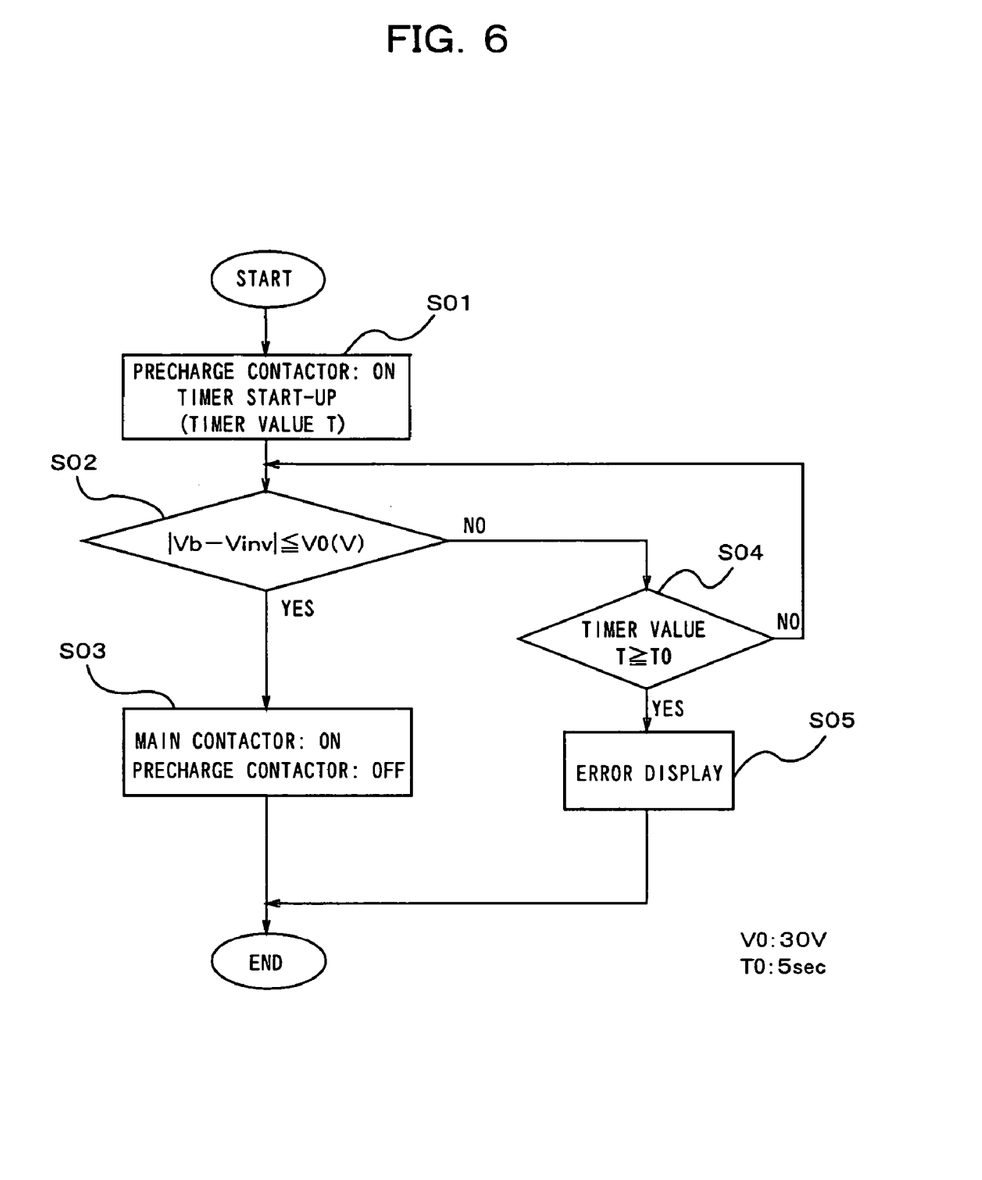
FIG. 6 is a flowchart showing how precharge control is performed by the conventional voltage converting circuit shown in FIG. 4.

In the case where the conclusion of the precharge control is judged based on a voltage difference, a voltage rise rate, etc., the judgment is normally made as shown in FIG. 6. In the example of FIG. 6, the precharge conclusion is judged by whether the aforementioned voltage difference is a predetermined value or less.

As shown in FIG. 6, if precharge control is started, in step S01 the precharge contactor 107 is made on and the precharge control advances to step S02. In step S02, the difference between the voltage $V_b$ of the vehicle drive battery 102 and the voltage $V_{inv}$ of the inverter 104 is compared with a predetermined value. When the difference is the predetermined value or less, precharge is judged to have been concluded and the precharge control advances to step S03. Then, in step S03, the main contactor 106 is made on, while the precharge contactor 107 is made off.

In step S02, if the difference between the vehicle drive battery voltage $V_b$ and the inverter voltage $V_{inv}$ is greater than the predetermined value, the precharge control advances to step S04. In step S04, the lapse of time from the start of the precharge control is compared with a predetermined period of time (5 seconds in the example shown in FIG. 6). When the lapse of time is within the predetermined period of time, the precharge control returns to step S02. Also, in step S04, when the lapse of time is the predetermined period of time or greater, the circuit is judged to have some fault and the precharge control advances to step S05. In step S05 an error display is performed, and since the lapse of time exceeds the predetermined period of time, the precharge control is stopped.

However, in the aforementioned prior art, it sometimes takes a much longer time than normal to start and conclude the precharge control. In that case, before the voltage of the capacitor 105 rises sufficiently, the precharge control exceeds a predetermined period of time. As a result, trouble such as the start-up failure of the DC/DC converter 101 sometimes occurs.

Because of this, the inventors have made various investigations with respect to this phenomenon and found the following fact. That is, the DC/DC converter 101 sometimes begins to operate during precharge control. This can cause the aforementioned trouble.

If the DC/DC converter 101 begins to operate during precharge control, electric power will be supplied to the electric equipment battery 103 through the DC/DC converter 101. As a result, the electric power that is supplied to the capacitor 105 is reduced and it takes time to charge the capacitor 105. In addition, when a demand for electric power on the load side (vehicle-mounted electric equipment 110, etc.) is great, a great variation in voltage occurs and during precharge control the electric power charged in the capacitor 105 flows to the load side, so that the voltage of the capacitor 105 is sometimes reduced.

Because of this, the capacitor 105 is not charged quickly and the precharge control takes time. Before the voltage of the capacitor 105 rises sufficiently, the precharge control exceeds a predetermined period of time. As a result, trouble such as the start-up failure of the vehicle drive motor 109 is caused.

In addition, as described above, if the DC/DC converter 101 operates during precharge, a rise in the voltage of the capacitor 105 becomes gentle. This can cause misjudgment if the conclusion of the precharge control is judged based on the condition of a lapse of time, a voltage rise rate, or the like. Even when the voltage of the capacity 105 does not rise sufficiently and the original precharge conclusion condition is not satisfied, there is a possibility that the main contactor 106 will be made on and excessive rush current will be generated.

Hence, the inventors have made further investigations with respect to the cause of the DC/DC converter 101 operating during precharge control and found that the cause lies in that, depending on the charged condition of the vehicle drive battery 102, its voltage varies up and down. This cause will hereinafter be described in further detail.

The operating voltage of the DC/DC converter 101 is set to a slightly lower value than the lower limit value of the normal voltage of the vehicle drive battery 102, based on the normal voltage range of the vehicle drive battery 102.

Figure 5B:
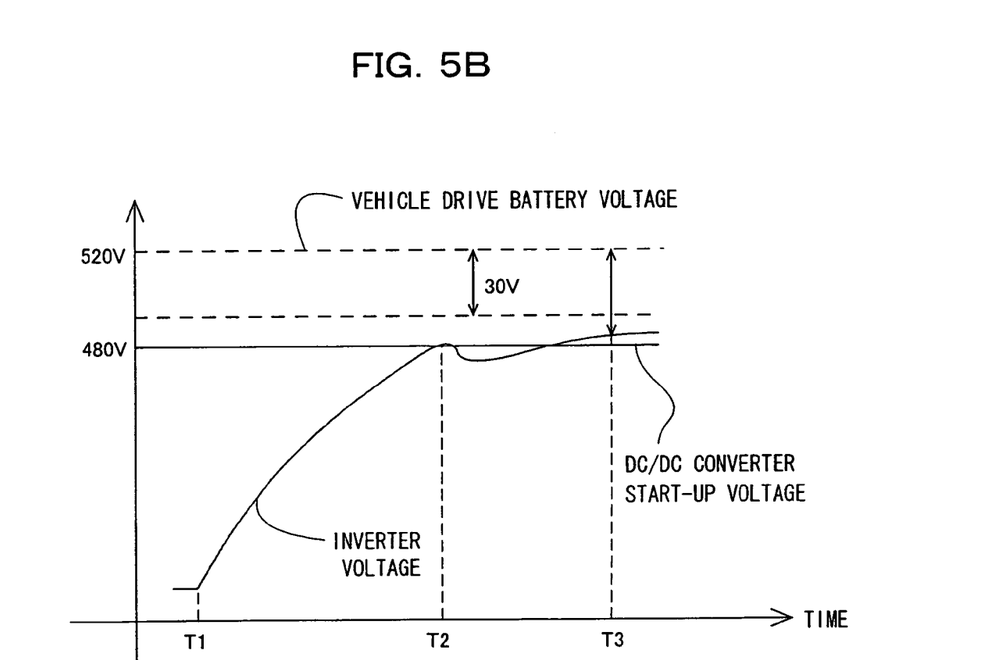

However, the voltage of the vehicle drive battery 102 sometimes rises to about the upper limit value of the normal voltage when it is fully charged. For instance, when the normal voltage range is 485 to 520 V, the actual voltage of the vehicle drive battery 102 sometimes reaches 520 V, as shown in FIG. 5B. In this case, during precharge control, the voltage on the inverter side reaches the operating voltage (480 V) of the DC/DC converter 101 before the voltage difference between the vehicle drive battery side and the inverter (capacitor) side becomes sufficiently small. This causes the DC/DC converter 101 to operate.

To overcome such trouble, if the operating voltage of the DC/DC converter 101 is set to a higher voltage side (e.g. 500 V), when the voltage of the vehicle drive battery 102 is close to the lower limit value of the normal voltage range there is a possibility that even if the main contactor 106 is made on after the conclusion of the precharge control, the DC/DC converter 101 will not operate.

SUMMARY OF THE INVENTION

The present invention has been made in view of the circumstances described above. Accordingly, it is the primary object of the present invention to provide a voltage converting circuit for electric vehicles that is capable of stably performing precharge control from the high voltage battery to the inverter when the high voltage battery charges the low voltage battery.

To achieve this end, there is provided a voltage converting circuit for electric vehicles, which comprises five major components: (1) a high voltage battery for supplying electric power to a vehicle drive motor; (2) an inverter, which is interposed between the high voltage battery and the vehicle drive motor and has a capacitor, for converting a direct current, supplied from the high voltage battery, to an alternating current and supplying to the vehicle drive motor; (3) a voltage converter, connected to the high voltage battery in parallel with the inverter, for converting voltage of the high voltage battery to a low voltage and outputting the low voltage; (4) a contactor circuit, interposed between the high voltage battery and the inverter, for performing a process of suppressing rush current relative to the inverter when supplying electric power of the high voltage battery to the vehicle drive motor; and (5) voltage converter start-up enabling means for enabling start-up of the voltage converter when a conclusion of the suppression process performed by the contactor circuit is sensed.

According to the voltage converting circuit of the present invention, even in the case where the voltage of the capacitor reaches the operating voltage of the voltage converter when a rush current suppression process is being performed by the precharge circuit, the voltage converter by no means operates because the voltage converter start-up enabling means does not enable start-up of the voltage converter. Because of this, the vehicle drive battery is able to charge the capacitor quickly without supplying electric power to the voltage converter, so that the rush current suppression process can be concluded. Stable precharge control can be performed by avoiding a start-up failure due to the precharge control exceeding a predetermine period of time. In addition, since a rise in voltage of the capacitor becomes stable, the occurrence of excessive rush current can be prevented, without making a misjudgment even in the case where the conclusion of the rush current suppression process is judged by a lapse of time or a voltage rise rate.

The aforementioned contactor circuit preferably comprises a main contactor and a precharge circuit. The precharge circuit preferably comprises a precharge contactor arranged in parallel with the main contactor, and an electric resistor arranged in series with the precharge contactor.

In this case, the capacitor is charged while preventing the occurrence of excessive rush current by suitable electric resistance. This makes it possible to perform the rush current suppression process with a simpler construction.

The voltage converting circuit of the present invention may further comprise converter control means for controlling operation of the voltage converter. The voltage converter start-up enabling means may be provided in the converter control means. The voltage converter start-up enabling means may comprise (1) an operation control unit for causing the voltage converter to operate when a start-up enabling signal is input and also a previously set operating voltage is input, and (2) a switch through which the start-up enabling signal is input to the voltage converter, and which is turned from off to on in synchronization with switchover of the main contactor from off to on.

In this case, the voltage converter start-up means comprises a switch through which the start-up enabling signal is input to the voltage converter, and which synchronizes the main contactor. This makes it possible to reliably prevent the voltage converter from operating during the rush current suppression process with a simpler construction.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
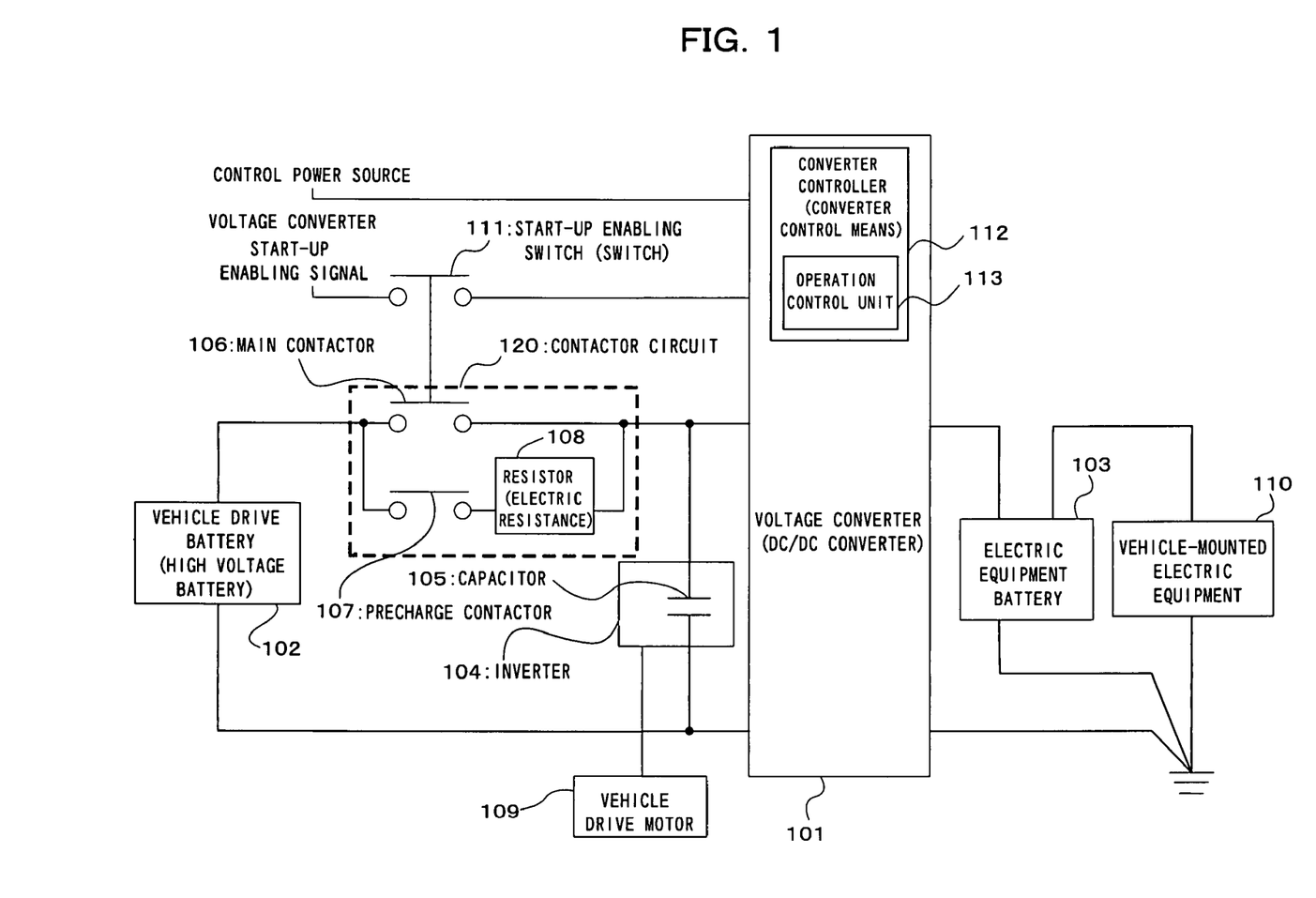
FIG. 1 is an electric circuit diagram showing a voltage converting circuit for electric vehicles constructed in accordance with a preferred embodiment of the present invention.
Figure 2:
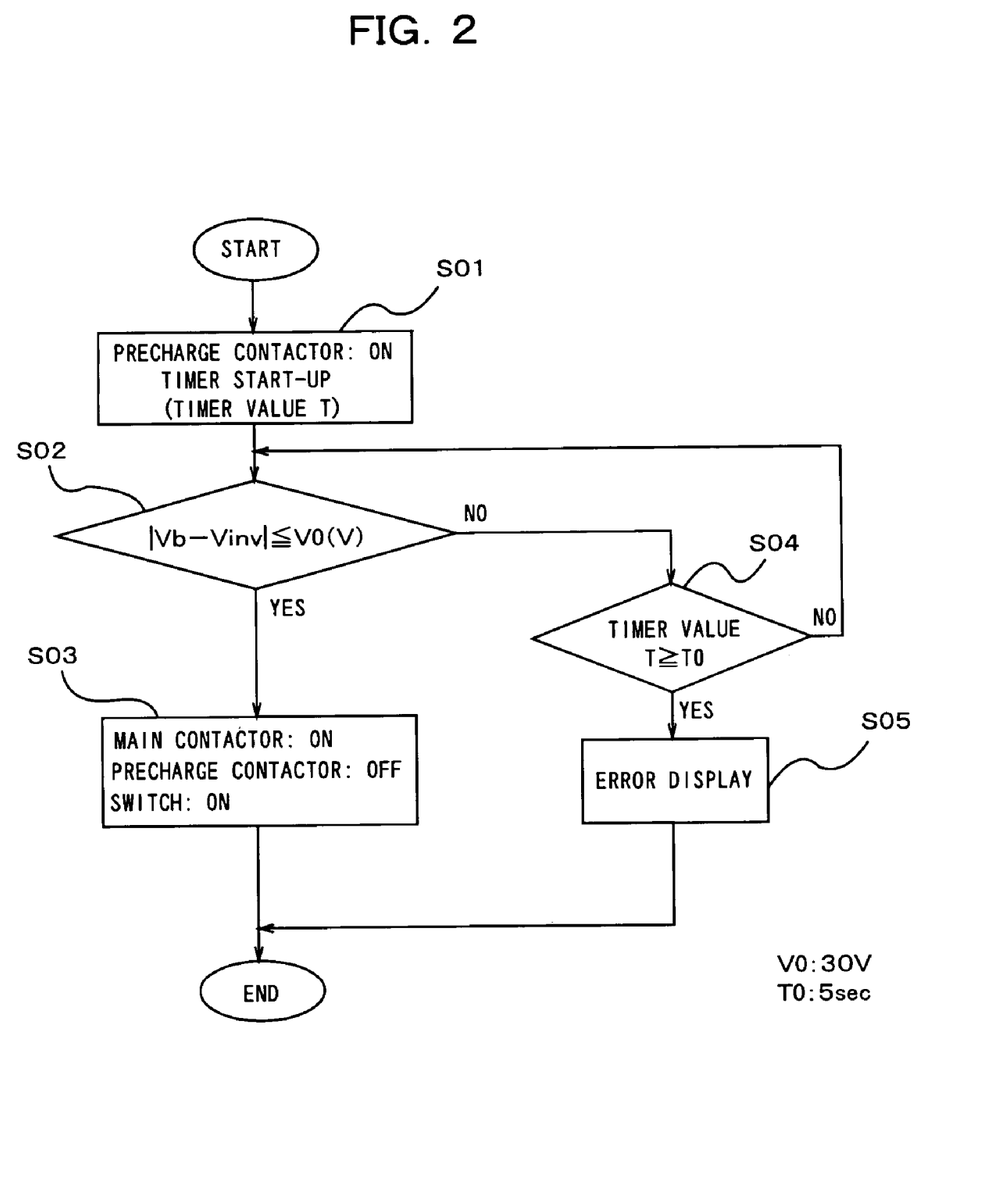
FIG. 2 is a flowchart showing how precharge control is performed by the voltage converting circuit of the preferred embodiment.
Figure 3:
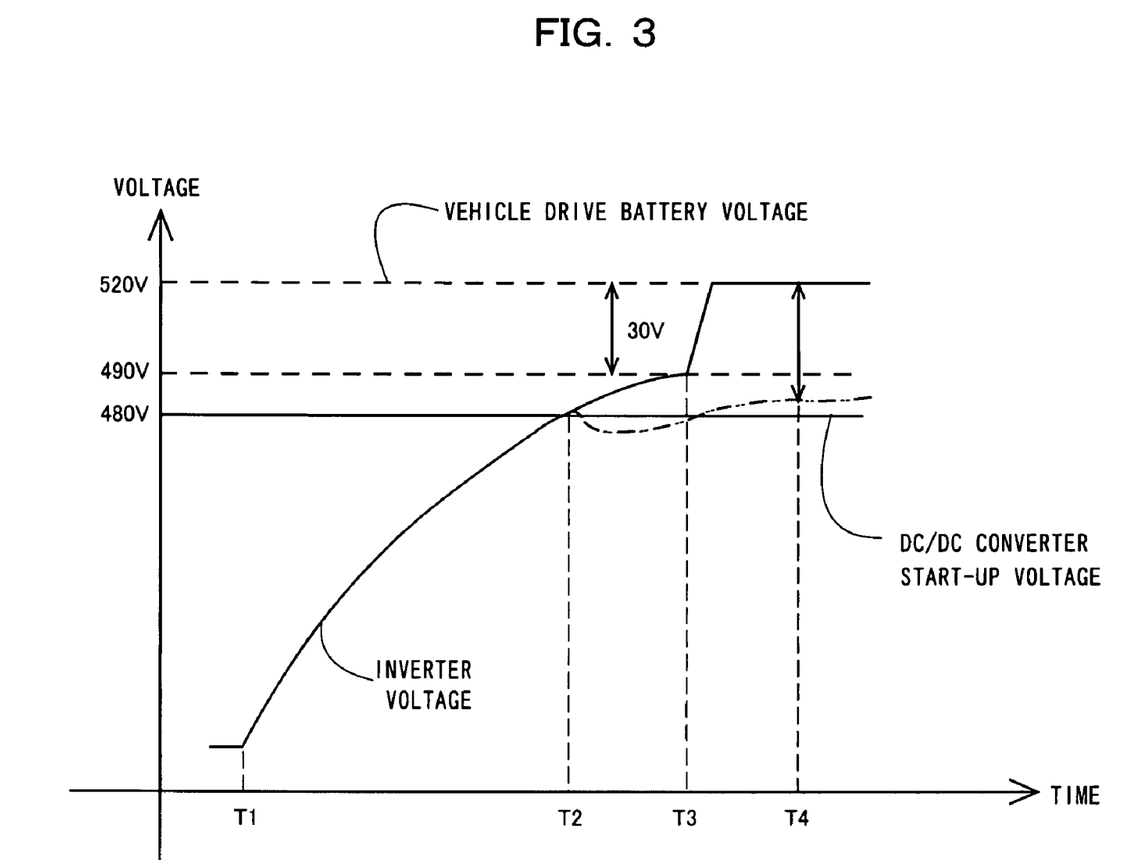
FIG. 3 is a graph showing the relationship between (1) a rise in voltage of the inverter and (2) the voltage of vehicle drive battery and operating voltage of the DC/DC converter when precharge control is performed by the voltage converting circuit of the preferred embodiment.

Referring to FIGS. 1 to 3, there is shown a voltage converting circuit for electric vehicles constructed in accordance with a preferred embodiment of the present invention. In FIG. 1, the same parts as the prior art in FIG. 4 are given the same reference numerals.

As shown in FIG. 1, the voltage converting circuit of the preferred embodiment is equipped with a vehicle drive motor 109; a high-voltage (e.g. 500 V) vehicle drive battery (high voltage battery) 102; an inverter 104 having a capacitor 105; a DC/DC converter (voltage converter) 101; and a contactor circuit 120 including a precharge circuit.

The vehicle drive motor 109 is connected with the vehicle drive battery 102 through the inverter 104. An electric equipment battery 103 is connected to the vehicle drive battery 102 through the DC/DC converter 101 in parallel with the inverter 104. The electric equipment battery 103 is further connected to vehicle-mounted electric equipment 110.

The contactor circuit 120 includes a main contactor 106 and a precharge circuit arranged in parallel with the main contactor 106. The precharge circuit consists of a precharge contactor 107 and a resistor 108 arranged in series with the precharge contactor 107. The contactor circuit 120 is disposed on a higher voltage side than the inverter 104. The aforementioned capacitor 105 is provided at the input terminal of the inverter 104.

Therefore, in the contactor circuit 120, at the time of precharge control the precharge contactor 107 is first made on, so that the capacitor 105 is gradually charged while suppressing excessive rush current by the electric resistance of the resistor 108. Thereafter, if the capacitor 105 is sufficiently charged, and the difference between the voltage of the vehicle drive battery 102 and the voltage of the capacitor 105 is a predetermined value or less (30 V in the preferred embodiment), the main contactor 106 is made on and the precharge contactor 107 is made off.

Note that opening and closing of the main contactor 106 and precharge contactor 107 is controlled by an electronic control unit (not shown), based on both a voltage value sensed at the vehicle drive battery 102 and a voltage value sensed at the inverter 104.

The DC/DC converter 101 is further connected with a control power source and receives a voltage converter start-up enabling signal. The voltage converter start-up enabling signal is input to the DC/DC converter 101 through a start-up enabling switch (voltage converter start-up enabling means) 111 that interlocks with the main contactor 106. Therefore, if the main contactor 106 is switched over from off to on, the start-up enabling switch 111 is turned from off to on. As a result, the voltage converter start-up enabling signal is input to a converter controller 112 provided within the DC/DC converter 101. The converter controller 112 is equipped with an operation control unit 113 for causing the DC/DC converter 101 to operate when the voltage converter start-up enabling signal is input and also a previously set operating voltage is input. In this embodiment, the operating voltage of the DC/DC converter 101 is set to 480 V.

Since the voltage converting circuit of the preferred embodiment is constructed as described above, precharge control is performed when the vehicle drive motor 109 is actuated, as shown in FIG. 2. That is, in the case where the vehicle drive motor 109 is actuated when the electric vehicle is started, in step S01 the precharge contactor 107 is made on and a timer is operated.

In step S02, the difference between the voltage $V_b$ of the vehicle drive battery 102 and the voltage $V_{inv}$ of the inverter 104 (capacitor 105) is compared with a predetermined value V0 (e.g. 30 V). If the difference is greater than the predetermined value V0, the precharge control advances to step S04. In step S04, a timer value T measured in step S01 is compared with a predetermined period of time T0 (e.g. 5 seconds). If the timer value T is less than T0, the precharge control returns to step S02.

In step S02, if the difference between the voltage $V_b$ of the vehicle drive battery 102 and the voltage $V_{inv}$ of the inverter 104 is the predetermined value V0 or less, the precharge control advances to step S03. In step S03, the main contactor 106 is made on and the precharge contactor 107 is made off. At the same time when the main contactor 106 is made, the start-up enabling switch 111 is made on, so that the precharge control is concluded.

In step S04, if the timer value T is the predetermined period of time T0 or greater, the precharge control advances to step S05. In step S05, an error display is performed and the precharge control is concluded (or stopped). That is, in step S01, if the precharge contactor 107 is made on, the electric power of the vehicle drive battery 102 is supplied to the capacitor 105 via the resistor 108 and therefore the capacitor 105 is gradually charged without excessive rush current being generated.

In step S02, if the capacitor 105 is sufficiently charged and the voltage difference between the vehicle drive battery 102 and the capacitor 105 is judged to be sufficiently small (predetermined value 30 V or less), the precharge control advances to step S03. In step S03, the main contactor 106 is made on, whilst the precharge contactor 107 is made off.

At the same time when the main contactor 106 is made on, the start-up enabling switch 111 is made on and therefore the voltage converter start-up enabling signal is input to the DC/DC converter 101. At this time, since the main contactor 106 is made on, a voltage greater than the operating voltage of the DC/DC converter 101 is applied to the DC/DC converter 101. In addition to this, since the start-up enabling switch 111 is made on, the voltage converter start-up enabling signal is input to the DC/DC converter 101. Therefore, the DC/DC converter 101 begins to operate, and the electric power of the vehicle drive battery 102 is converted through the DC/DC converter 101 to a low voltage, which is accumulated and stored in the electric equipment battery 103. The supply of electric power from the electric equipment battery 103 causes the vehicle-mounted electric equipment 110 to operate.

If the main contactor 106 is made on, the DC power of the vehicle drive battery 102 is converted through the inverter 104 to AC power, which is supplied to the vehicle drive motor 109. Since the vehicle drive motor 109 is driven by a motor controller (not shown), the driving wheels connected to the vehicle drive motor 109 are rotated.

Therefore, in the voltage converting circuit of the preferred embodiment, the charging rate of the vehicle drive battery 102 is high as shown in FIG. 3. In the case where the rush current suppression process is performed when the output voltage is close to the upper limit value of the normal voltage range, the voltage converter start-up signal is not issued from the start-up enabling switch 111, even if the voltage of the capacitor 105 reaches the operating voltage (480 V) of the DC/DC converter 101 before the difference between the voltage of the vehicle drive battery 102 and the voltage of the capacitor 105 becomes the predetermined value V0 (30 V) or less. Therefore, the DC/DC converter 101 by no means begins to operate.

As indicated by a solid line in FIG. 3, if the precharge contactor 107 is made on at time T1, the capacitor 105 is gradually charged and rises in voltage. The voltage of the capacitor 105 reaches the operating voltage (480 V) of the DC/DC converter 101 at time T2, but since the difference between the voltage of the vehicle drive battery 102 and the voltage of the capacitor is greater than the predetermined value (30 V), at this point there is no possibility that the main contactor 106 and start-up enabling switch 111 will be made on. Therefore, there is no possibility that the DC/DC converter 101 will operate.

If the voltage of the capacitor 105 rises and the voltage difference between the capacitor 105 and the vehicle drive battery 102 becomes the predetermined value (30 V) or less, the main contactor 106 is made on and therefore the voltage of the capacitor 105 rises steeply and becomes approximately the same as the voltage of the vehicle drive battery 102. At the same time when the main contactor 106 is made on, the start-up enabling switch 111 is turned on and therefore the DC/DC converter 101 begins to operate.

Thus, in the voltage converting circuit of the preferred embodiment, there is no possibility that, as in prior art indicated by a two-dot dash line in FIG. 3, due to the DC/DC converter 101 operating at time T2, the electric power of the vehicle drive power 102 will flow to the DC/DC converter 102 during the time interval T2 to T4 and the voltage of the capacitor 105 will be temporarily reduced, or the voltage rise of the capacitor 105 will become unstable (e.g. arise in voltage will become gentle). In addition, there is no possibility that due to the voltage of the capacitor 105 not rising sufficiently even at time T4 and precharge control exceeding a predetermined period of time, trouble such as the start-up failure of the vehicle drive motor 109 will occur.

While the present invention has been described with reference to the preferred embodiment thereof, the invention is not to be limited to the details given herein, but may be modified within the scope of the invention hereinafter claimed.

For example, in the preferred embodiment, the condition of the conclusion of the precharge control is that the voltage difference between the vehicle drive battery 102 and the capacitor 105 is a predetermined value or less. However, the conclusion condition may be that the voltage rise rate of the capacitor 105 is a predetermined rise rate or less.

That is, as shown in FIG. 3, during precharge control, the voltage rise rate of the capacitor 105 becomes gradually gentler with a rise in voltage. Therefore, even in the case where precharge control is concluded by sensing that the voltage rise of the capacitor 105 is a predetermined voltage rise rate or less, the same advantages as the preferred embodiment can be obtained. In addition, since there is no possibility that as in prior art indicated by a two-dot dash line in FIG. 3, the voltage rise of the capacitor 105 will become unstable, there is no possibility of misjudging the conclusion of the precharge control and therefore excessive rush current can be reliably suppressed.

The conclusion of the precharge control may be judged based on only the lapse of time from start. In this case, as indicated in steps S04 and S05 of FIG. 2, when the condition of the precharge conclusion is not satisfied even after the lapse of a predetermined period of time from the start of the precharge control, the precharge control cannot be stopped by judging that there is a possibility of the circuit having some fault, but the voltage rise of the capacitor can be judged with a simpler construction.

In the preferred embodiment, while the start-up enabling switch 111 interlocking with the main contactor 106 controlled by an electronic control unit is employed as voltage converter start-up enabling means, opening and closing of the main contactor 106 and operation of the DC/DC converter 101 may be controlled separately by the electronic control unit. When the predetermine precharge conclusion condition (such as a voltage difference, a voltage rise rate, a lapse of time, etc.) is satisfied, the electronic control unit may make the main contactor 106 on and make the start-up enabling switch 111 on.

Finally, the present invention is applicable not only to electric vehicles equipped with a high voltage battery for supplying electric power to the vehicle drive motor and a low voltage battery for supplying electric power to vehicle-mounted electric equipment, but also to hybrid electric vehicles.

What is claimed is:

1. A voltage converting circuit for electric vehicles comprising:
    a high voltage battery for supplying electric power to a vehicle drive motor;
    an inverter, which is interposed between said high voltage battery and said vehicle drive motor and has a capacitor, for converting a direct current, supplied from said high voltage battery, to an alternating current and supplying to said vehicle drive motor;
    a voltage converter, connected to said high voltage battery in parallel with said inverter, for converting a voltage of said high voltage battery to a low voltage and outputting said low voltage;
    a contactor circuit, interposed between said high voltage battery and said inverter, for performing a process of suppressing rush current relative to said inverter when supplying electric power of said high voltage battery to said vehicle drive motor; and
    voltage converter start-up enabling means for enabling start-up of said voltage converter when a conclusion of the suppression process performed by said contactor circuit is sensed.

2. The voltage converting circuit as set forth in claim 1, wherein said contactor circuit comprises:
    a main contactor; and
    a precharge circuit comprising
        a precharge contactor arranged in parallel with said main contactor, and
        an electric resistor arranged in series with said precharge contactor.

3. The voltage converting circuit as set forth in claim 2, further comprising converter control means for controlling operation of said voltage converter;
    wherein said voltage converter start-up enabling means is provided in said converter control means and comprises
    an operation control unit for causing said voltage converter to operate when a start-up enabling signal is input and also a previously set operating voltage is input, and
    a switch through which said start-up enabling signal is input to said voltage converter, and which is turned from off to on in synchronization with switchover of said main contactor from off to on.

* * * * *